Sept. 27, 1966 K. BIEDERMANN ETAL 3,274,913
FOCUSING APPARATUS FOR CAMERAS AND THE LIKE
Filed June 10, 1964 5 Sheets-Sheet 1
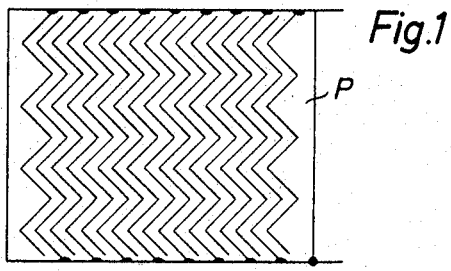
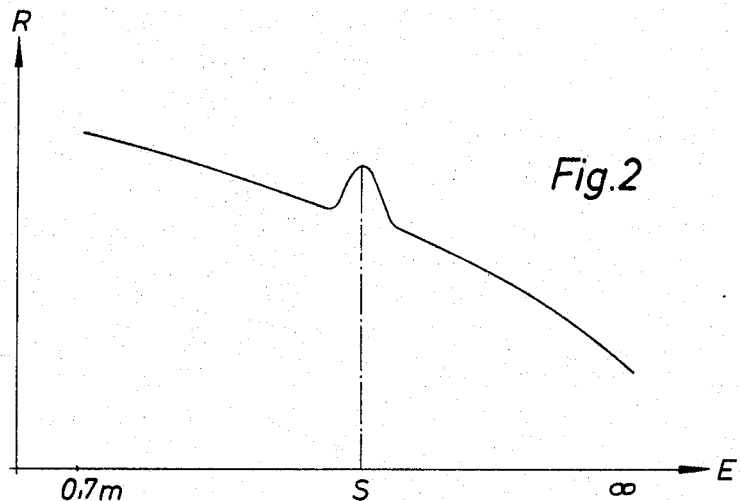
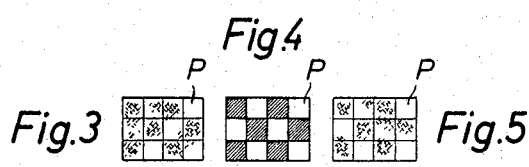 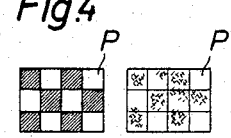
INVENTOR.
KLAUS BIEDERMANN
FRANZ JAKOB
ALFRED KUBITZEK
HANS-PETER SIMSON
BY Michael J. Striker Sept. 27, 1966   K. BIEDERMANN ETAL   3,274,913
FOCUSING APPARATUS FOR CAMERAS AND THE LIKE
Filed June 10, 1964   5 Sheets-Sheet 5

INVENTOR.
KLAUS BIEDERMANN
FRANZ JAKOB
ALFRED KUBITZEK
HANS-PETER SIMSON

BY Michael J. Striker ered Sept. 27, 1966

3,274,913
FOCUSING APPARATUS FOR CAMERAS AND THE LIKE

Klaus Biedermann and Franz Jakob, Unterhaching, Munich, Alfred Kubitzek, Grunwald, Munich, and Hans-Peter Simson, Tutzing, Germany, assignors to Agfa Aktiengesellschaft, Leverkusen, Germany
Filed June 10, 1964, Ser. No. 374,099
Claims priority, application Germany, June 14, 1963, A 43,325
21 Claims. (Cl. 95—44)

The present invention relates to cameras or other optical apparatus where an objective must be focused on a subject which is located at a given distance from the optical apparatus.

For automatically focusing of objectives it is already known, for example, to utilize the echoing return of electromagnetic beams (radar, for example) or to utilize acoustic vibrations in order to determine the distance between a subject and a camera. These known focusing methods, however, have the disadvantage of not being able to provide the best possible sharpness of the image at the focal plane.

It is accordingly a primary object of the present invention to provide a structure capable of focusing a camera or the like while using an optical, photoelectric type of structure. Thus, the structure of the invention uses photosensitive devices such as devices which includes layers of photoelectric material used in photocells or photosensitive resistors.

In particular, it is an object of the present invention to provide a focusing structure which operates on the principle that a given amount of light will provide a different electrical yield on a transducer which converts optical into electrical energy depending upon whether this given amount of light is concentrated so as to be received by a small area of the transducer or is dispersed over a relatively large area of the transducer.

Also, it is an object of the present invention to provide photosensitive transducers capable of utilizing the latter principle while at the same time having individual sensitive areas the configuration of which enable the areas to respond to a wide variety of configurations of a subject.

Furthermore, it is an object of the present invention to provide a structure utilizing the above principle for focusing a range finder which then indicates to the operator how to set the picture-taking objective or which can be used also for automatically focusing the picture-taking objective of the camera.

Furthermore, it is an object of the invention to provide a structure of the above type capable of utilizing but a small fraction of the light which is received in the interior of the camera so that the operation of the camera itself is uninfluenced by the structure of the invention.

With these objects in view the invention includes, in a structure for focusing a camera or the like, a pair of photosensitive transducers which are substantially identical and which are capable of converting optical into electrical energy. A means is provided for projecting onto these transducers a pair of real images, respectively, of a given subject, and this means which projects these images to the transducers is capable of focusing at least one of the images so as to achieve a predetermined relationship between the transducers, this predetermined relationship providing in a manner described below an indication of how a camera must be focused, for example, or even automatically focusing a camera or the like.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a diagrammatic illustration of the manner in which a photosensitive transducer may have its surface divided up into separate areas;

FIG. 2 is a graph of the operation of a photosensitive transducer;

FIGS. 3–5 illustrate the manner in which images will be received by a photosensitive transducer at different distances between the images and the transducer;

Figure 6:
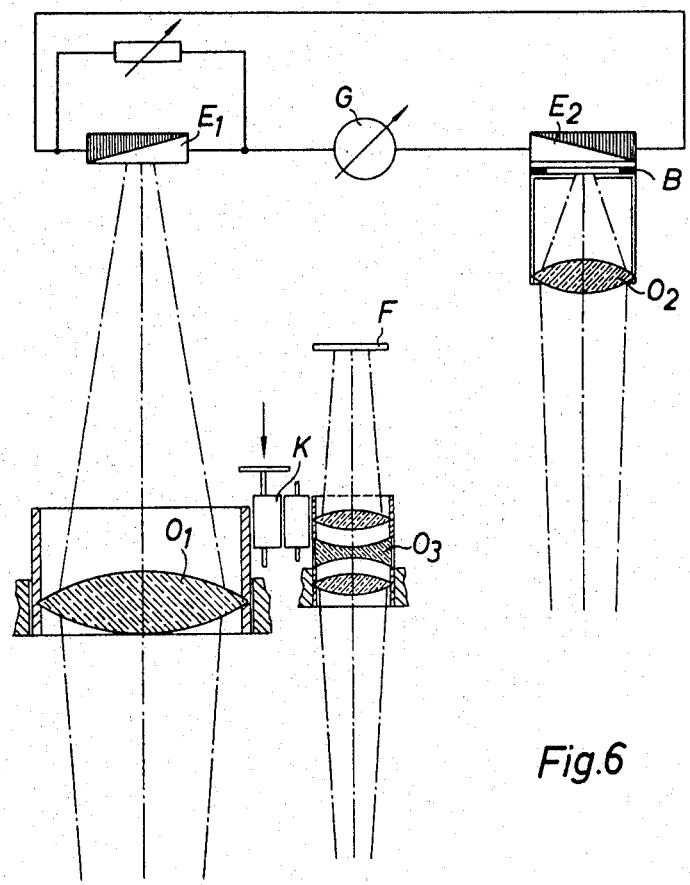
FIG. 6 is a schematic illustration of one possible embodiment of a structure for focusing an objective.

When light is directed against photosensitive surfaces of transducers capable of converting optical energy into electrical energy, such as photoelectric cells or photosensitive electrical resistors, the electrical yield depends upon the distribution of the light. Thus, if a predetermined amount of light is concentrated substantially on a single point of such a photosensitive surface, the electrical energy which will be yielded by the transducer will be different (in general smaller) than when the same amount of light is uniformly distributed, for example, over the entire photosensitive surface. This phenomenon is used in accordance with the present invention for controlling optical devices such as cameras in order to achieve a sharp image of a given subject, this image of course being provided at the image or focal plane.

In accordance with the invention the photosensitive transducer has its sensitive surface divided into a plurality of relatively small areas arranged according to a predetermined pattern such as a grid pattern, for example, so that these individual areas of the transducer act during exposure of the transducer to light to a very great extent as resistors which are as independent of each other as possible. Such a division of a photosensitive area into individual independent areas is for example at the present time frequently provided for controlling the exposure of motion picture cameras where photosensitive resistors are used for this purpose. With transducers of this latter type the above effect is also provided during exposure of the photosensitive transducer to an image of the subject which is to be photographed. Thus, it can be shown that when such a photosensitive transducer, in the form of a resistor whose resistance changes with change in the light intensity which is directed to the resistor, for example, is shifted along the optical axis, the electrical resistance will have a maximum value in the focal plane where a sharp image is achieved, and in general the behavior will be that which is shown by the graph of FIG. 2. Thus, referring to FIG. 2 it will be seen that the ordinate has resistance as its variable while the abscissa has the distance between the subject and the transducer as its variable, the graph of FIG. 2 being provided for a given photosensitive resistor P. As may be seen from the graph a resistance of the resistor P will at a predetermined distance S from the subject provide a sharp image of the subject, and this distance S is the distance at which the photosensitive resistor is situated at the focal plane.

Assuming, for example, that the subject has a checkerboard appearance composed of light and dark areas distributed in the manner of a checkerboard and that the subject is between the distance S and infinity with respect to the objective, then the photosensitive resistor will receive a blurred distribution of the dark and light areas in the immediate vicinity of the location where the image will be sharp, and this image is indicated in FIG. 3. On the other hand, if the distance S is provided between such a subject and the objective, then the subject will have a sharp image on the photosensitive resistor P, as indicated in FIG. 4. In this position the resistance will be a maximum and in the electrical circuit of the transducer the current will be a minimum. On the other hand, if the subject is situated too close to the objective then its image on the photosensitive resistor P will again lack sharpness, and this condition is illustrated in FIG. 5. The appearance of a maximum resistance when the objective is properly focused so that the subject provides a sharp image on the photosensitive resistor P, can be used for determining the focusing of a photographic objective as well as other optical devices.

The sensitive area of the photosensitive transducer (which can be a photoelectric element rather than a photosensitive resistor, and in the case of a photoelectric element the curve of FIG. 2 which corresponds to such an element will have a current-distance line which has a peak at the location where the image is sharpest) is preferably divided up into a plurality of individual areas arranged according to a predetermined pattern, such as a suitable raster in order to achieve in this way as large a number as possible of individual areas corresponding to the greatest contrast and the greatest sharpness of the image field. The rastering of the photosensitive surface should be made, if possible, so fine that the raster constant will be approximately 2–3 times the dispersion circle diameter, so that the raster constant has a value of approximately 0.2 . . . 0.5. Thus, the rastering must be carried out in such a way that irrespective of the direction of the contour of the subject, a sharp image can be achieved, and such an image will only be provided when the subject contour is perpendicular to the raster contour, so that in accordance with the invention an arrangement as shown in FIG. 1 where the raster extends along a serpentine or crossing path is provided so that irrespective of the contour direction of the subject there will be a considerable number of raster edges which will be perpendicular to the contour of the subject. Thus, with the structure of the invention the photosensitive surface of the transducer is divided up into a large number of small individual areas which will have, in accordance with the illustration shown in FIG. 1, a relatively large proportion of substantial dimensions both laterally and longitudinally of the transducer surface.

In the event that the above-described principles are applied to focusing of a photographic camera, for example, then it is possible to provide certain simplifications. Thus, the subject will only in the rarest cases fill the entire image area. Most frequently one is dealing with only a partial image, which is to say an image which occupies only part of the image area, and in almost all cases, particularly in amateur photography, it is only the central portion of the image area which is of significance. The amateur will attempt to provide a sharp image of a subject which is at the central portion of the image area while being content to allow the background and foreground to remain unsharp. This same principle is used with conventional range finders where images are superposed upon each other or where a split image is used for range finder purposes, in reflex cameras, for example. Thus, in the following description it is to be assumed that the image portion which is used to achieve sharpness is substantially smaller than the entire image content of a film frame. For the purpose of utilizing the maximum resistance of a photosensitive resistor or the minimum current of a photoelectric element for the purpose of achieving a sharp image with an adjustable objective, there are many possibilities as described below.

For example, referring to FIG. 6 it will be seen that a pair of photosensitive transducers in the form of photoelectric cells $E_1$ and $E_2$ are illustrated therein. These photosensitive transducers are electrically interconnected in a circuit which includes a galvanometer G, and light beams from a given subject are directed to the pair of photocells so that when these photocells $E_1$ and $E_2$ are of the same sensitivity and of the same optical characteristics, there will be no current flowing through the galvanometer when the subject is imaged on these photosensitive transducers with the same sharpness. Assuming now that the objective which directs the image to the transducer $E_2$ is an objective $O_2$ which has an opening and focal length which are capable of providing a sharp image of the subject at any location within a range from approximately 1 meter up to infinity without any change in the sharpness of the imaged subject, and that on the other hand a range finder objective $O_1$ is provided to project the same image to the photosensitive transducer $E_1$ but where this objective $O_1$ has only an extremely short depth of field so that the range of variation in the actual distance of the subject from the camera is extremely small in order to provide a sharp image at the photosensitive transducer $E_1$, then it is possible by viewing the position of the pointer of the galvanometer G to determine whether or not the subject is sharply imaged at the photosensitive transducer $E_1$. In order to guarantee that precisely the same image field is transmitted to the transducer $E_2$ as to the transducer $E_1$ a suitable frame-limiting structure B is provided between the objective $O_2$ and the transducer $E_2$. By adjusting a picture-taking objective $O_3$ which is coupled through a suitable transmission K with the range finder objective $O_1$ of relatively long focal length until the pointer of the galvanometer is in its zero position indicating that there is no current flowing between the pair of photosensitive transducers, it is possible to provide a sharp image of the subject through the picture-taking objective $O_3$ at the focal plane F. Thus, with this construction the operator need only adjust the picture-taking objective $O_3$ in order to simultaneously adjust the range finder objective $O_1$ and when the galvanometer pointer is in its zero position the operator will know that the objective $O_3$ is properly focused on the subject. This same method can be used with photosensitive transducers in the form of resistors, the only difference being that in such a case a balancing bridge circuit is used for determining when a balance is achieved between the resistors, this circuit being in the nature of Wheatstone bridge circuit, for example.

It is also possible, in accordance with the present invention, to use a pair of identical range finder objectives and to provide between one of the objectives and the photosensitive transducer aligned with the optical axis thereof a light-dispersing plate. Therefore, the image received by the latter transducer will always lack sharpness because of the dispersion of light. The range finder objective cooperating with the other transducer and the picture-taking objective are then adjusted until the minimum distance on the galvanometer between the pointer thereof and the zero position is achieved, and this will be the adjustment which will provide a sharp image of the subject at the focal plane of the camera. It will be seen that this operation is a direct application of the above-described principle according to which the same amount of light will generate different amounts of current in a photocell, for example, depending upon whether the light is concentrated or distributed over a relatively large area.

Figure 7:
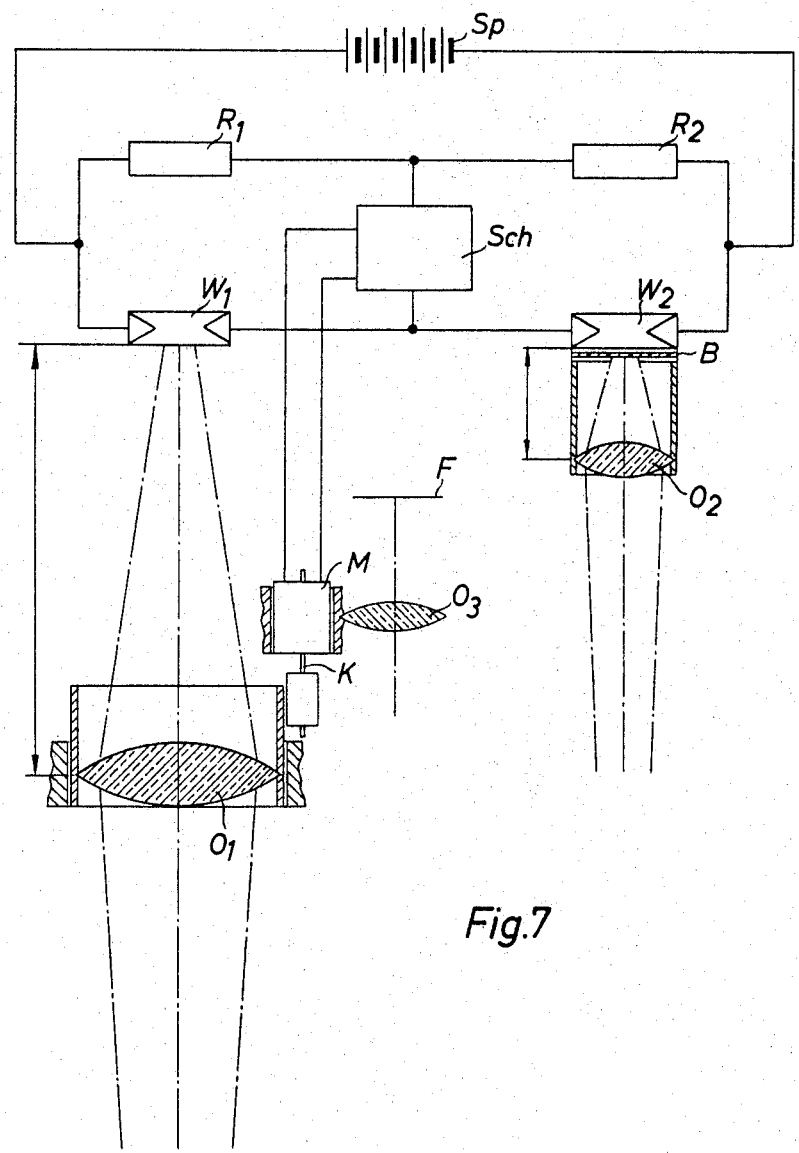
FIG. 7 is a schematic illustration of another embodiment of a structure for focusing a transducer.

Structures constructed according to the above principles can also be used for providing focusing with motor drives. When providing a motor-driven focusing, it is necessary to start the focusing adjustment from a predetermined end position, preferably the infinity position of the picture-taking objective $O_3$, so that when the motor places the parts in a position where there is a maximum resistance or a minimum current the motor can be deenergized through suitable electrical control structure. Such a control structure is known and in the simplest case can be in the form of a switch which is controlled by the pointer of the galvanometer itself or the control structure can take the form of a direct current relay which takes the place of the galvanometer. An arrangement of this type is illustrated in FIG. 7. In FIG. 7 those elements which correspond to those of FIG. 6 are indicated with the same reference characters. However, it will be seen that in FIG. 7 instead of the photocells $E_1$ and $E_2$, there are a pair of photosensitive resistors $W_1$ and $W_2$, which form the pair of photosensitive transducers of this embodiment, and these transducers, in the form of photosensitive resistors, are connected into a balancing bridge circuit with a pair of fixed resistors $R_1$ and $R_2$, a suitable source of potential $Sp$ being connected to the balancing bridge circuit. Instead of a galvanometer, the circuit is connected with a relay $Sch$ which actuates a switch for starting and stopping the electric motor M which is operatively connected with the range finder objective $O_1$ and the picture-taking objective $O_3$ for simultaneously adjusting these objectives, the motor being coupled with the range finder objective $O_1$ by a suitable coupling K.

This embodiment of FIG. 7 will operate in precisely the same way as the embodiment of FIG. 6. The objective $O_2$ of short focal length will provide a sharp image at the resistor $W_2$ at any distance ranging from about 1 meter up to infinity, and when the range finder objective is adjusted to provide at the resistor $W_1$ an image matching that at the resistor $W_2$ the objective $O_3$ will be properly focused on the subject. Until this balance is achieved the coil of the relay is energized so as to maintain closed the switch of the circuit of the motor M, and this motor continues to adjust the objectives. However, when balance is achieved there will no longer be any current flowing in the circuit which includes the relay so that the normally opened relay switch will now automatically open and deenergize the motor. When the next film frame is moved into a position to be exposed, the objectives $O_1$ and $O_3$ will be automatically set at a starting position where they are at infinity, for example, and then during the next operations to make the exposure the structure will operate in the manner described above. For example, the conventional shutter release will act through a suitable retarding mechanism on the shutter elements to retard the actual opening of the shutter by a length of time sufficient to permit the motor to focus the objectives $O_1$ and $O_3$, and the actuation of the shutter release will close a switch of the circuit shown in FIG. 7 so as to start the operations, and thus in this way the structure will automatically focus the camera.

Figure 8:
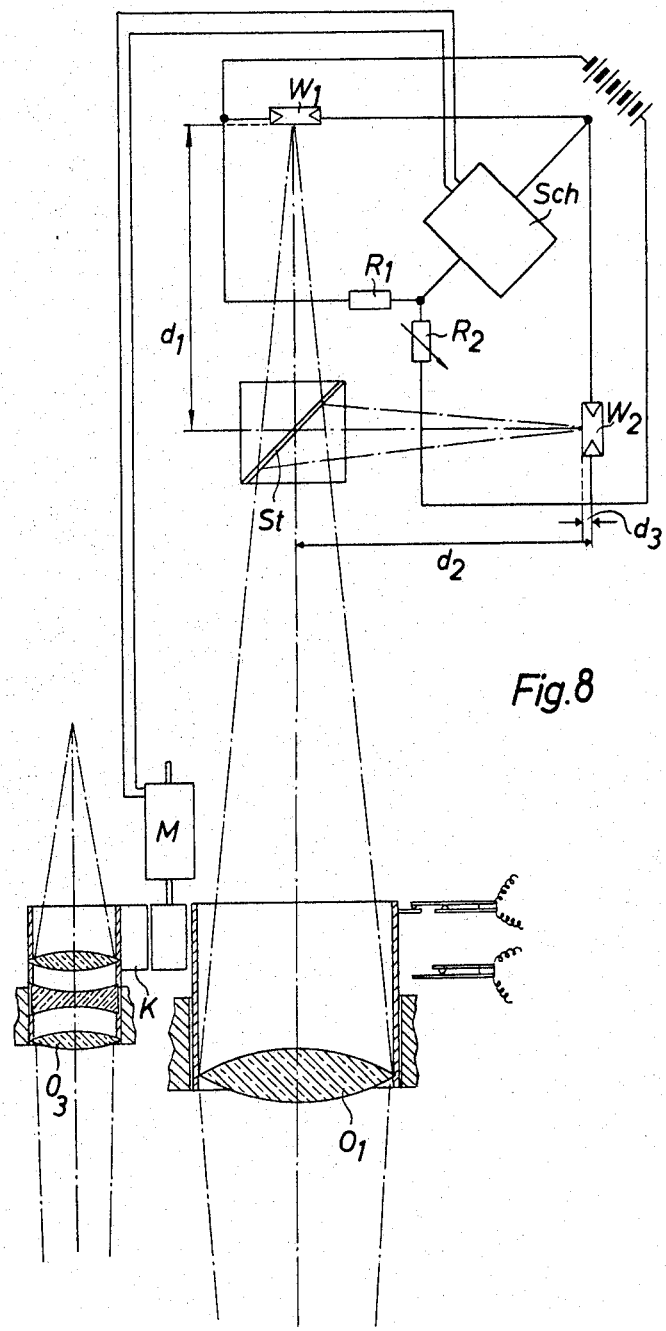
FIG. 8 is a schematic illustration of a further embodiment of a structure for focusing an objective.

In the embodiment of the invention which is illustrated in FIG. 8, only a single range finder objective $O_1$ is used. This objective is again coupled with the picture-taking objective $O_3$, and the adjustment of these objectives can be carried out by an electric motor which is coupled to the objectives through the transmission K, as diagrammatically shown in FIG. 8. A beam splitter $St$ is located along the optical axis of the range finder objective $O_1$, and this beam splitter splits the light beam into a pair of identical light beams which are directed respectively in different directions, and the pair of photosensitive transducers in the form of resistors $W_1$ and $W_2$ (or photoelectric cells) are respectively situated in the paths of the beam portions into which the beam is split by the beam splitter. Thus, the resistors $W_1$ and $W_2$ will be located at the distances $d_1$ and $d_2$, respectively, from the beam splitter, and these distances are not equal. In accordance with one of the features of the invention the distances differ from each other by an increment $d_3$, which must correspond to the depth of field which provides half the maximum resistance or minimum current value, or, in other words, which for both of the transducers provides an effective depth of field where the overlap in the depths of fields of both transducers on the one hand is not more than ⅔ of the total depth of field and on the other hand is not less than ⅓ of the total depth of field. Assuming that with this construction of FIG. 8 the subject on which the camera is sighted does not provide a sharp image at the focal plane of the objective $O_1$, then of course the balancing bridge circuit of FIG. 8 is unbalanced. Inasmuch as the photosensitive resistors $W_1$ and $W_2$ are at different distances from the beam splitter, the resistor $W_2$ will be provided with the sharpest image when the objective is adjusted from a starting position at infinity before the resistor $W_1$ and then the resistor $W_2$ receives light beyond that which is provided by the image which will result in the maximum resistance. Thus, during further adjustment of the objective $O_1$ to the point where precisely the sharpest image is achieved the resistance values of the pair of photosensitive resistors $W_1$ and $W_2$ will be identical in magnitude, since the resistance value of the photosensitive resistor $W_2$ has already gone beyond its maximum and is diminishing. Thus, if the resistors are connected in a balancing bridge circuit the pointer of the galvanometer will reach its zero position, and if a relay is connected in the above-described manner to the motor M, this motor will now stop operating.

Figure 9:
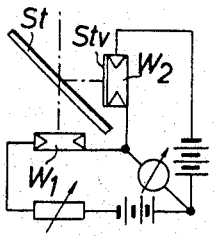
FIG. 9 illustrates a circuit and beam splitter structure which cooperates with a pair of photosensitive transducers.
Figure 10:
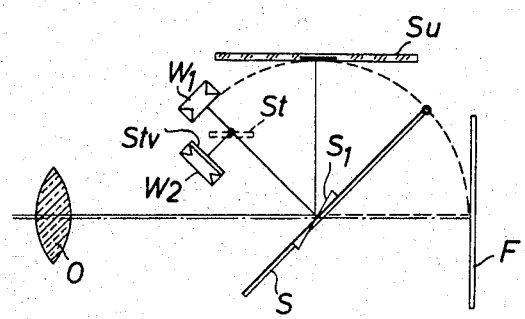
FIG. 10 shows schematically an embodiment of the invention particularly suited for use with a single lens reflex camera.
Figure 11:
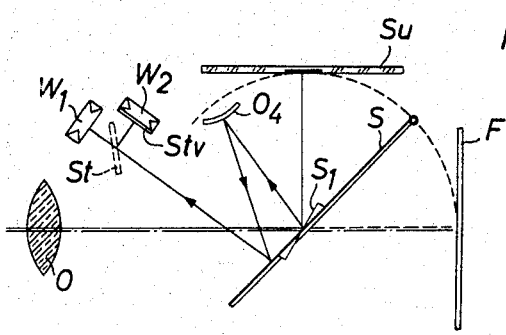
FIG. 11 shows a variation of the structure of FIG. 10 enabling the image which is received by the transducers to be magnified.

In the embodiments of FIGS. 9–11, the photosensitive resistors $W_1$, $W_2$, or corresponding photoelectric elements, are situated at equal distances from the beam splitter $St$. However, in this case there is arranged in front of the photosensitive resistor $W_2$ a light-dispersing plate $Str$, so that the image received by the resistor $W_2$ is always unsharp. It is possible to use here a photosensitive transducer which is not divided up into individual areas so that a rastering is unnecessary. In order to control the motor use is made here of the maximum value of the resistance of the photosensitive resistor $W_1$ which corresponds to the resistance value of the photosensitive resistor $W_2$ when a sharp image is achieved on the resistor $W_1$, this maximum resistance of course resulting in a minimum current. In order to provide a further simplification, the embodiments of FIGS. 10 and 11 include only a single objective O which serves not only to expose the film but also as a range finder control. In the beam which passes through the objective along its optical axis there is a semi-transparent reflector S which in a known way directs a part of the light beam to the film F and another part to the reflex finder $Su$. A small part of the reflector $S_1$, which is of no significance with respect to the exposure of the film for making a photograph, has a different inclination with respect to the optical axis of the objective O than the reflector S. Thus, the light rays which reach the small insignificant part $S_1$ of the reflector direct light to the beam splitter which then directs the light to the pair of photosensitive resistors $W_1$ and $W_2$ in order to provide a range finder control. In the event that the images directed to the photosensitive transducers should be enlarged, it is possible to provide between the reflector portion $S_1$ and the beam splitter $St$ a reflecting optical element $O_4$ which enlarges the image. This optical element $O_4$ can, for example, be a convex mirror.

Of course, the invention is not limited to the details described above and shown in the drawing. For example it is possible to eliminate in the embodiments of FIGS. 9–11 the light-dispersing plate $Str$ and instead to situate the photosensitive resistors $W_1$, $W_2$ at different distances from the focal plane of the objective O, so that now the structure will correspond to the embodiment of FIG. 8. Moreover, it is possible to use the automatic control of the objective and range finder with a moving objective, so that the structure is of particular utility with motion picture cameras. Thus, assuming that the range finder objective is adjusted either by hand or automatically while sighted upon a given subject according to the above-described methods, then in a predetermined position there will be an electrical balance. However, the movement of the subject itself will destroy this electrical balance, so that the object is no longer sharply imaged on the transducer. An automatic focusing of the camera objective to maintain it focused upon such a moving subject is possible in the following manner:

The variation in resistance according to FIG. 2 is electronically differentiated. In the out-of-focus condition the range finder system $O_1$ is situated either to the right or left of the peak potential or resistance, depending upon the direction in which the distance between the subject and the camera is changing, and thus the differentiated signals will be either only positive or only negative. Thus, it is possible to determine the direction of rotation of the structure for adjusting the objective, and this structure again operates for a length of time which is capable of providing the maximum sharpness in the manner described above.

For many purposes it is better if the curve of FIG. 2 after passing through its peak continues to fall at relatively small distances between the subject and the objective. Such a resistance-distance curve can be achieved by directing into the range finder only a small light beam and providing the transducers with sensitive areas which are substantially greater than the image projected on these areas, not only at the plane in which a sharp image is provided but also before and behind this plane. In order to utilize the peak of such a curve for range finder determination and controls it is possible to use all of the above-described methods and apparatus which are capable of being used for the peak of the curve of FIG. 2.

Furthermore, with the embodiments of FIGS. 6 and 7, instead of making the range finder objectives of long focal length $O_1$ adjustable and connecting them operatively with the picture-taking objective, it is possible to provide a fixed objective $O_1$ and to make the transducer which cooperates therewith adjustable with respect to the fixed objective and to interconnect this adjustable transducer with the picture-taking objective $O_3$. Of course, with such a construction instead of automatically returning the objective to a starting position at infinity the transducer would be returned to a starting position at infinity, for example when the film-transporting structure is actuated or when the shutter cocking structure is actuated. Also, the retarding mechanism which retards the operation of the shutter until after the focusing has been completed can be adapted to cooperate with such a movable transducer rather than with the adjustable objective as described above.

It will be understood that each of the elements described above, or two or more together, may also find a useful application in other types of cameras differing from the types described above.

While the invention has been illustrated and described as embodied in camera focusing structures, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore such adaptations should and are intended to be comprehended within the meaning and range of equivalence of the following claims.

What is claimed as new and desired to be secured by Letters Patent is:

1. In a photographic camera, in combination, an objective lens; a focusing arrangement for said objective lens comprising a pair of photoelectric means each including a photo-sensitive element and adapted to create electrical impulses the intensity of which depend on variation of the intensity of the light reaching the respective photo-sensitive element, the photo-sensitive element of at least one of said photoelectric means constructed so as to be adapted to cause the respective photoelectric means to create different electrical impulses depending not only on the intensity but also the distribution of light reaching said photosensitive element, and means for directing real images of the same object onto both of said photo-sensitive elements, at least one of said means being adjustable for varying the sharpness of the image on at least the photo-sensitive element of said one photoelectric means so that the respective photoelectric means creates electrical impulses which depend in intensity upon variations of the sharpness of the image on the respective photo-sensitive element; and focusing means for focusing said objective lens and being actuated by said combined electrical impulses of both said photoelectric means only when the variations of electrical impulses of said one photoelectric means due to variations of distribution of light reaching the photosensitive element of said one photoelectric means do not coincide with variations of the electrical impulses of the ohter of said photoelectric means due to variation of distribution of light reaching the photo-sensitive element of the other of said photoelectric means.

2. In an apparatus as recited in claim 1, said means for directing real images onto said photo-sensitive elements including a pair of adjustable objectives respectively situated in front of said photo-sensitive elements for projecting said real images to said elements, one of said obpectives having a relatively short focal length and a relatively large depth of field, and the other of said objectives having a relatively long focal length and a relatively short depth of field.

3. In an apparatus for focusing a camera or the like, in combination, a pair of objectives of respectively long and short focal length; a pair of photosensitive transducers respectively situated behind said pair of objectives for receiving real images therefrom, respectively, said photosensitive transducer situated behind said objective of short focal length receiving a sharp image of the subject and the photosensitive transducer behind said objective of long focal length receiving a sharp image of the subject after said objective of long focal length has been properly focused; means operatively connected to both of said photosensitive transducers for indicating when the transducer behind said objective of long focal length has a sharp image matching that of the transducer behind said objective of short focal length; and a picture-taking objective coupled with said objective of long focal length to be focused with the latter so that said picture-taking objective will be automatically focused upon adjusting of said objective of long focal length to provide on the transducer behind the latter a sharp image.

4. In a photographic camera according to claim 1, said photo-sensitive elements being substantially identical to one another.

5. In a photographic camera according to claim 1, wherein said means for directing the real images comprises a pair of stationary objectives one of which has a relatively short focal length and the other of which has a relatively long focal length and means operatively connected to the photo-sensitive element which is behind said objetive of long focal length for adjusting the latter photosensitive element along the optical axis of said objective of long focal length for varying the sharpness of the image on the latter photo-sensitive element.

6. In a photographic camera according to claim 1, wherein said means for directing real images of the same object onto both of said photo-sensitive elements constitutes the adjustable means for varying the sharpness of the image.

7. In a photographic camera according to claim 1, one of said pair of photoelectric means being adjustable and constituting said adjustable means for varying the sharpness of the image, on the respective one of said photo-sensitive elements.

8. In a photographic camera according to claim 1, said photo-sensitive elements being substantially identical and each thereof including a plurality of individual sensitive areas arranged according to a predetermined pattern.

9. In a photographic camera according to claim 8, wherein said sensitive areas are relatively small and have a relatively high proportion of substantial dimensions both lengthwise and transversely of the respective photo-sensitive element.

10. In a photographic camera according to claim 1, said focusing means including balancing bridge circuit means electrically connected with said pair of photo electric means for determining when a balance therebetween is achieved.

11. In a photographic camera according to claim 1, said focusing means including electric motor means and electrical means operatively connected to said photoelectric means and to said motor means for automatically stopping the operation of the latter when a predetermined relationship between said photoelectric means is achieved.

12. In a photographic camera according to claim 1 further comprising electric motor means operatively connected to said means for directing real images of the same object onto both of said photo-sensitive elements.

13. In a photographic camera according to claim 1, said photo-sensitive elements comprising, respectively, identical photo-sensitive transducers for converting optical into electrical energy, said combination further comprising means situated in front of said photo-sensitive element of the other of said photoelectric means for providing thereon a blurred image of the object which is pure in contrast.

14. In an apparatus as recited in claim 13, said means for directing said images onto said photo-sensitive elements including a pair of separate objectives along whose optical axes said photo-sensitive elements are situated, respectively.

15. In a photographic camera according to claim 1, said means for directing real images including adjustable objective means and beam splitting means located along the optical axis of said adjustable objective means for receiving a beam which has passed through said objective means and for directing the beam into a pair of different directions, said pair of photo-sensitive elements respectively located along the paths of movement of the beams derived from said beam splitting means, and one of said photo sensitive elements being situated closer to said beam splitting means than the other.

16. In a photographic camera according to claim 1, further comprising meter means operatively connected to said photoelectrical means and including a pointer which indicates when a predetermined relationship between said photoelectric means is achieved.

17. In a photographic camera according to claim 1, said means focusing at least one of said images and providing on said photo-sensitive elements images which in all adjusted positions of said means are smaller than the areas of said photo-sensitive elements, said photo-sensitive elements having substantially identical properties.

18. In a photographic camera according to claim 1, return means operatively connected to said adjustable means for returning the latter to a predetermined starting position after each exposure.

19. In a photographic camera according to claim 1, said camera having a shutter release and means for delaying release of the shutter of the camera until after focusing of the image on the photo-sensitive element of said one photoelectric means has been completed.

20. In an apparatus for focusing cameras or the like, in combination, a single objective; beam splitting means located along the optical axis of said objective for splitting a light beam traveling along said optical axis through said objective into a pair of beam portions respectively extending in different directions; and a pair of photo-sensitive transducers respectively located in the paths of said beam portions for receiving real images from said objective, one of said transducers having an image initially different from that of the other of said transducers and said objective being adjustable until the image of said other transducer has a predetermined relation with respect to the image of said one transducer indicating when the objective is focused on a subject, said objective being the objective of a single lens reflex camera and part of the light which is directed through said objective being reflected to a viewfinder of the camera.

21. In a single lens reflex camera, in combination, an objective; a viewfinder; a reflector located behind said objective and in alignment with said viewfinder for directing light which has passed through said objective to said viewfinder, said reflector having a relatively small surface portion which directs a relatively small fraction of the light to a location different from that where said viewfinder is situated; beam splitting means situated at said location for receiving said fraction of the light which is not directed to said viewfinder, said beam splitting means dividing the fraction of light into a pair of light beam portions respectively extending in different directions from said beam splitting means; and a pair of photo-sensitive transducers respectively situated in the paths of the light beams directed in said different directions by said beam splitting means.

References Cited by the Examiner
UNITED STATES PATENTS

| | | | |
|---|---|---|---|
| 2,968,994 | 1/1961 | Shurcliff | 88—24 |
| 3,037,423 | 6/1962 | Shurcliff | 88—24 |
| 3,054,898 | 9/1962 | Westover | 88—1 |
| 3,143,588 | 8/1964 | Donald | 88—1 |
| 3,185,059 | 5/1965 | Durst | 95—44 |

JOHN M. HORAN, *Primary Examiner.*